US012150906B2

(12) United States Patent
Krupski et al.

(10) Patent No.: US 12,150,906 B2
(45) Date of Patent: Nov. 26, 2024

(54) TOILET SEAT ASSIST SYSTEM AND METHOD OF MAKING AND USING SAME

(71) Applicant: SedMed Inc., Woodbridge, CT (US)

(72) Inventors: Timothy Krupski, Cromwell, CT (US); Jeremy Bronen, Woodbridge, CT (US)

(73) Assignee: SedMed Inc., Woodbridge, CT (US)

(*) Notice: Subject to any disclaimer, the term of this patent is extended or adjusted under 35 U.S.C. 154(b) by 0 days.

(21) Appl. No.: 18/019,539

(22) PCT Filed: Jun. 8, 2021

(86) PCT No.: PCT/US2021/036401
§ 371 (c)(1),
(2) Date: Feb. 3, 2023

(87) PCT Pub. No.: WO2022/031365
PCT Pub. Date: Feb. 10, 2022

(65) Prior Publication Data

US 2023/0218461 A1 Jul. 13, 2023

Related U.S. Application Data

(60) Provisional application No. 63/061,464, filed on Aug. 5, 2020.

(51) Int. Cl.
*A61G 7/10* (2006.01)
*A47K 13/10* (2006.01)

(52) U.S. Cl.
CPC ............ *A61G 7/1007* (2013.01); *A47K 13/10* (2013.01); *A61G 7/1038* (2013.01);
(Continued)

(58) Field of Classification Search
CPC .. A61G 7/1007; A61G 7/1038; A61G 7/1059; A61G 7/1076; A61G 7/1092; A47K 13/10
(Continued)

(56) References Cited

U.S. PATENT DOCUMENTS 4,587,678 A 5/1986 Love et al.
4,690,457 A * 9/1987 Poncy ...................... A61G 5/14
297/337

(Continued)

OTHER PUBLICATIONS

International Search Report and The Written Opinion, International Application No. PCT/US2021/036401, dated Jul. 26, 2021, mailed Sep. 16, 2021.

(Continued)

*Primary Examiner* — Tuan N Nguyen
(74) *Attorney, Agent, or Firm* — Nutter McClennen & Fish LLP

(57) ABSTRACT

An apparatus is described herein that comprises a toilet seat assist system configured to be mounted to a toilet. The seat has a forward end portion and an aft end portion, an upper portion and a lower portion, a base having an upper portion connected to the lower portion of the seat, and a lower portion, at least one forward pivot mechanism connecting the seat to the base, at least one non-electric biasing energy storage mechanism connected to the upper portion of the base and the lower portion of the seat, the non-electric biasing energy storage mechanism being configured to move the aft end portion of the seat between a lowered position and a raised position. Corresponding methods also are disclosed.

13 Claims, 22 Drawing Sheets

(52) U.S. Cl.
CPC ......... *A61G 7/1059* (2013.01); *A61G 7/1076* (2013.01); *A61G 7/1092* (2013.01)

(58) Field of Classification Search
USPC .............................................................. 4/667
See application file for complete search history.

(56) References Cited

U.S. PATENT DOCUMENTS

| | | | | |
|---|---|---|---|---|
| 5,189,739 | A * | 3/1993 | Thierry ................ | A61G 7/1007 4/667 |
| 5,440,767 | A | 8/1995 | Bergenwall | |
| 6,067,674 | A | 5/2000 | Moser | |
| 6,598,246 | B1 * | 7/2003 | Shou .................... | A61G 7/1007 4/667 |
| 2006/0048296 | A1 | 3/2006 | Sutou et al. | |
| 2009/0188028 | A1 * | 7/2009 | Jiang .................... | A61G 7/1007 4/239 |
| 2014/0230142 | A1 * | 8/2014 | Baker .................. | A61G 7/1007 4/667 |
| 2019/0290519 | A1 | 9/2019 | Sjogren et al. | |

OTHER PUBLICATIONS

International Preliminary Report on Patentability, International Application No. PCT/US2021/036401, dated Dec. 13, 2022.

* cited by examiner

Figure 9A
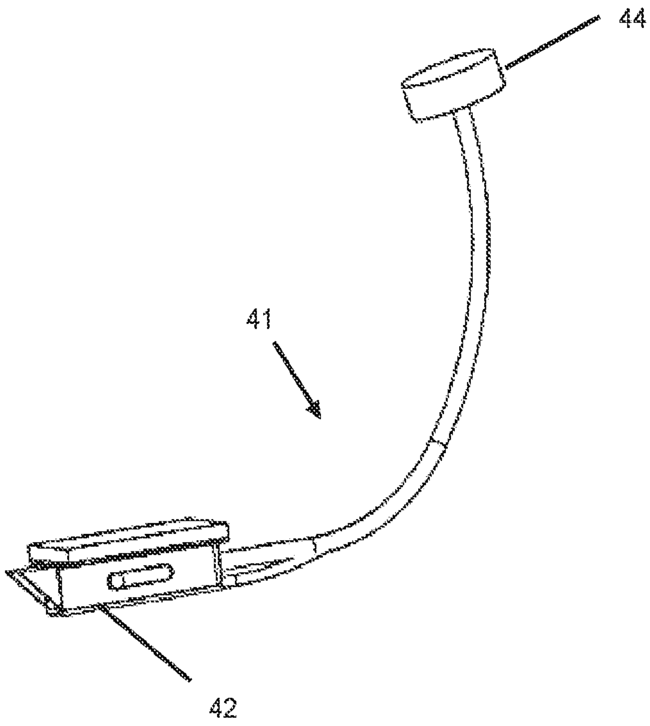
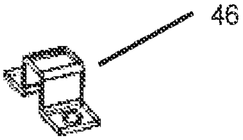
Figure 9B

TOILET SEAT ASSIST SYSTEM AND METHOD OF MAKING AND USING SAME

CROSS-REFERENCE TO RELATED APPLICATIONS

This application is a national stage filing of International Application No. PCT/US2021/036401, filed Jun. 8, 2021, which claims priority to, and the benefit of, U.S. Provisional Application No. 63/061,464, entitled Toilet Seat Assist System and Methods of Making and Using Same, filed on Aug. 5, 2020, the contents of which are incorporated by reference herein in their entirety.

FIELD OF THE INVENTION

The present invention is generally directed to assistive toilet seats, and more particularly to non-electric assistive toilet seats.

BACKGROUND

Devices that assist an individual in sitting down and standing up from a toilet are generally known, and are used by individuals with temporary injuries and permanent physical disabilities. Many of these devices are powered by electricity and include relatively large frames that are supported on portions of a floor that surround a toilet.

It would be useful to develop a non-electric assistive toilet seat with simplified construction and enhanced ease of use.

SUMMARY

One embodiment described herein is an apparatus comprising a seat having a forward end portion and an aft end portion, an upper portion and a lower portion, and a base configured to be mounted to a toilet, the base having an upper portion connected to the lower portion of the seat, and a lower portion. At least one forward pivot mechanism connects the seat to the base, the at least one forward pivot mechanism being configured to enable the seat to rotate relative to the base. The apparatus also includes at least one non-electric biasing energy storage mechanism connected to the upper portion of the base and the lower portion of the seat, the non-electric biasing energy storage mechanism being configured to move the aft end portion of the seat between a lowered position and a raised position. In some cases, the apparatus includes a locking device configured to temporarily lock the seat into a selected angular position relative to the base.

Another embodiment is an apparatus, comprising a seat having a forward end portion and an aft end portion, an upper portion and a lower portion, a base configured to be mounted to a toilet, the base having an upper portion connected to the lower portion of the seat, and a lower portion, at least one forward hinge connecting the seat to the base, the at least one forward hinge being configured to enable the seat to rotate relative to the base, and at least one spring connecting the upper portion of the base to the lower portion of the seat, the spring being configured to move the aft end portion of the seat between a lowered position and a raised position. In some cases, the spring is a gas spring. In certain embodiments, the apparatus further comprises a locking device configured to temporarily lock the seat into a lowered position.

Yet another embodiment described herein is an apparatus comprising a seat configured to be mounted to a toilet, the seat having a forward end portion and an aft end portion, an upper portion and a lower portion, and a base having an upper portion connected to the lower portion of the seat, and a lower portion. At least one forward hinge connects the seat to the base, and is configured to enable the seat to rotate relative to the base. The apparatus also includes at least one gas spring connected to the upper portion of the base and the lower portion of the seat, the gas spring being configured to move the aft end portion of the seat between a lowered position and a raised position, and a locking device configured to temporarily lock the seat into a selected angular position relative to the base.

In some cases, the apparatus includes an angle selector configured to adjust the maximum extended position of the gas spring. In embodiments, the apparatus includes clamps configured to provide additional support for the apparatus on the toilet. In some cases, the apparatus further comprises at least one aft hinge configured to connect the base to the toilet to support the apparatus on the toilet, and to allow the base and the seat to temporarily fold upwardly to a vertical orientation.

A further embodiment is a method to assist a user in lowering themselves onto, and raising themselves off of, a toilet, the method comprising providing an apparatus including a seat having a forward end portion, an aft end portion, a base mounted to the toilet, at least one forward pivot mechanism connecting the seat to the base and enabling the seat to rotate relative to the base, at least one non-electric biasing energy storage mechanism configured to move the aft end portion of the seat between a lowered position and a raised position, first and second support handles that are upwardly and outwardly extending relative to the seat, and first and second lifting handles formed on upper ends of the first and second support handles. The method includes upwardly rotating the aft end portion of the seat through operation of the non-electric biasing energy storage mechanism such that the seat is in an angled position relative to a horizontal plane, assisting the user in sitting down on the seat, the weight of the user causing the seat to rotate from the angled position to a horizontal position in a controlled manner, and assisting the user in raising themselves off of the seat with a portion of their weight supported by the first and second support handles and first and second lifting handles, the aft portion of the seat rotating upwardly through operation of the non-electric biasing energy storage mechanism as the user moves from a seated position to a standing position. In some cases, the apparatus includes first and second gripping handles, and the user holds the gripping handles while sitting down on the seat as the seat moves between an angled position and a horizontal position.

BRIEF DESCRIPTION OF THE DRAWINGS

Some embodiments of the present invention are illustrated as an example and are not limited by the figures of the accompanying drawings, in which like references may indicate similar elements and in which:

FIG. 9A shows one embodiment of a locking mechanism comprising a latch to lock the seat in place.

FIG. 9B shows a receiver associated with the locking mechanism.

DETAILED DESCRIPTION

Figure 1A:
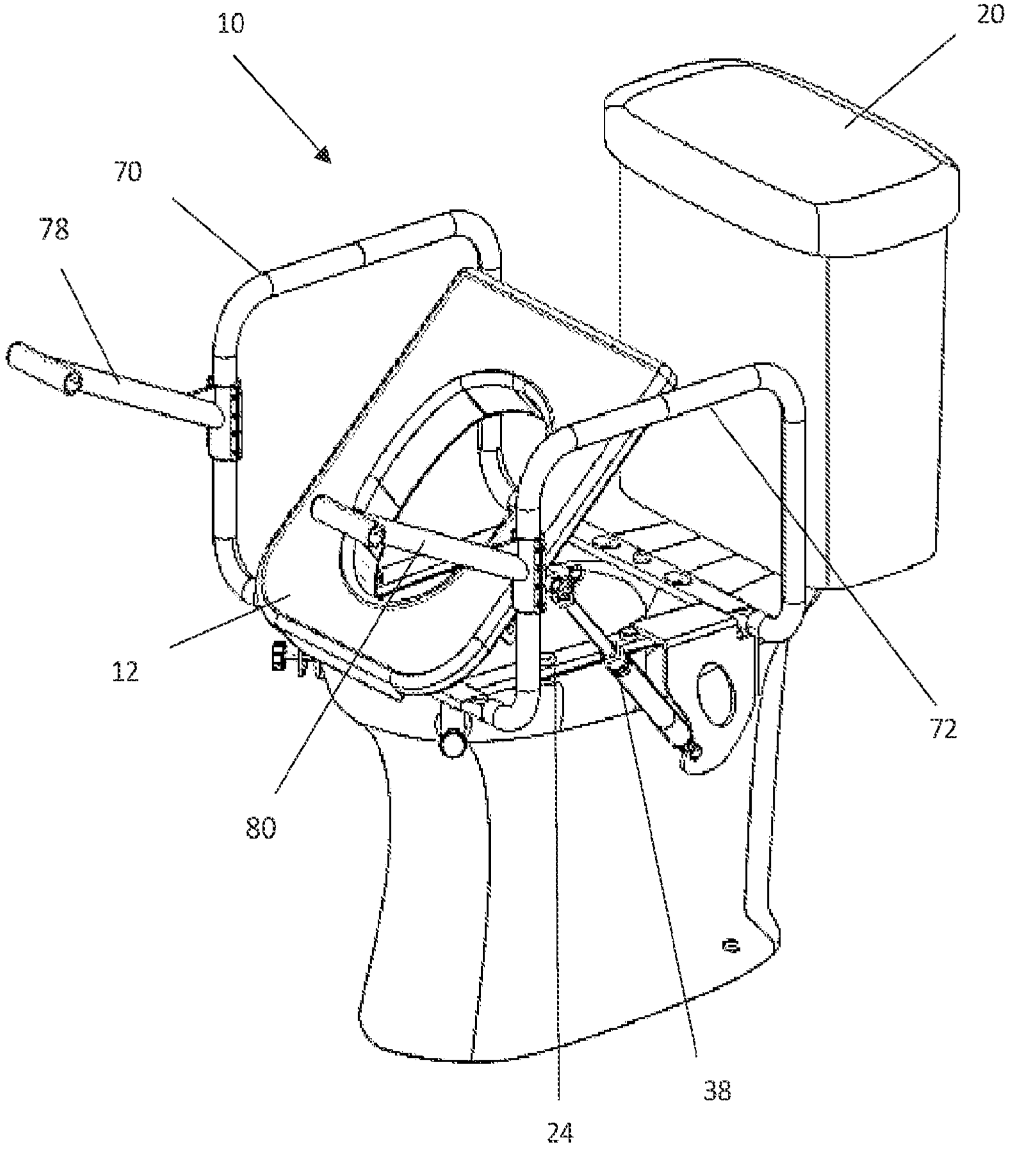
FIG. 1A shows a perspective view of a first embodiment of a toilet seat assist system in accordance with a first embodiment described herein.

Many people, including people who have muscle weakness or injuries, struggle to safely sit and stand with a traditional toilet seat. Existing products have attempted to resolve this issue, however toilet seat raisers and commodes have the disadvantage of not lowering and raising a user to a standard height. Additionally, existing products that both lower and raise a user often require an electrical connection. Known devices can be bulky and space inefficient, preventing them from being used in small bathrooms. A number of devices require expert installation. By incorporating the combination of ergonomic pull bars, the ability to mount directly on any toilet, and a biasing energy storage mechanism, such as a spring, the embodiments described herein allow users to safely and efficiently lower themselves onto a toilet and stand back up afterwards with additional assistance through purely passive means without requiring any source of electricity.

The assembly disclosed herein allows the user to sit on the device just as one would a standard toilet, however the seat is raised at a designated angle so that the user meets the seat at a higher position. The user's weight then compresses the non-electric biasing energy storage mechanism, which allows the seat to start to descend in a slow and controlled manner. The seat lowers to a similar height of a standard toilet. An optional locking mechanism activates, securing the device in a stationary sedentary position. When ready, the user deactivates the locking mechanism and shifts their weight forward with the option to use at least one of the arm rests, comprising gripping handles, support handles, and lifting handles. As the user's body weight shifts away from the toilet, the non-electric biasing energy storage mechanism starts to push against the seat propelling the user up and forward allowing them to stand with the majority of their weight supported.

In embodiments, at least one of the gripping handles, support handles, and lifting handles are removable as some users may have space constraints in their bathrooms or prefer one option over the other. In some cases, at least one of the height and length of the gripping handles, support handles, and lifting handles are adjustable to accommodate users of various sizes.

The terminology used herein is for the purpose of describing particular embodiments only, and is not intended to be limited. As used herein, the term "and/or" includes any and all combinations of one or more of the associated items. As used herein, the singular forms "a", "an", and "the", are intended to include the plural forms as well as the singular forms, unless the context clearly indicates otherwise.

Unless otherwise defined, all terms (including technical and scientific terms) used herein have the same meaning as commonly understood by one having ordinary skill in the art to which this invention belongs. It will be further understood that the terms, such as those defined in commonly used dictionaries, should be interpreted as having a meaning that is consistent with their meaning in the relevant and the present disclosure and will not be interpreted in an idealized or overly formal sense unless expressly so defined herein.

Figure 1B:
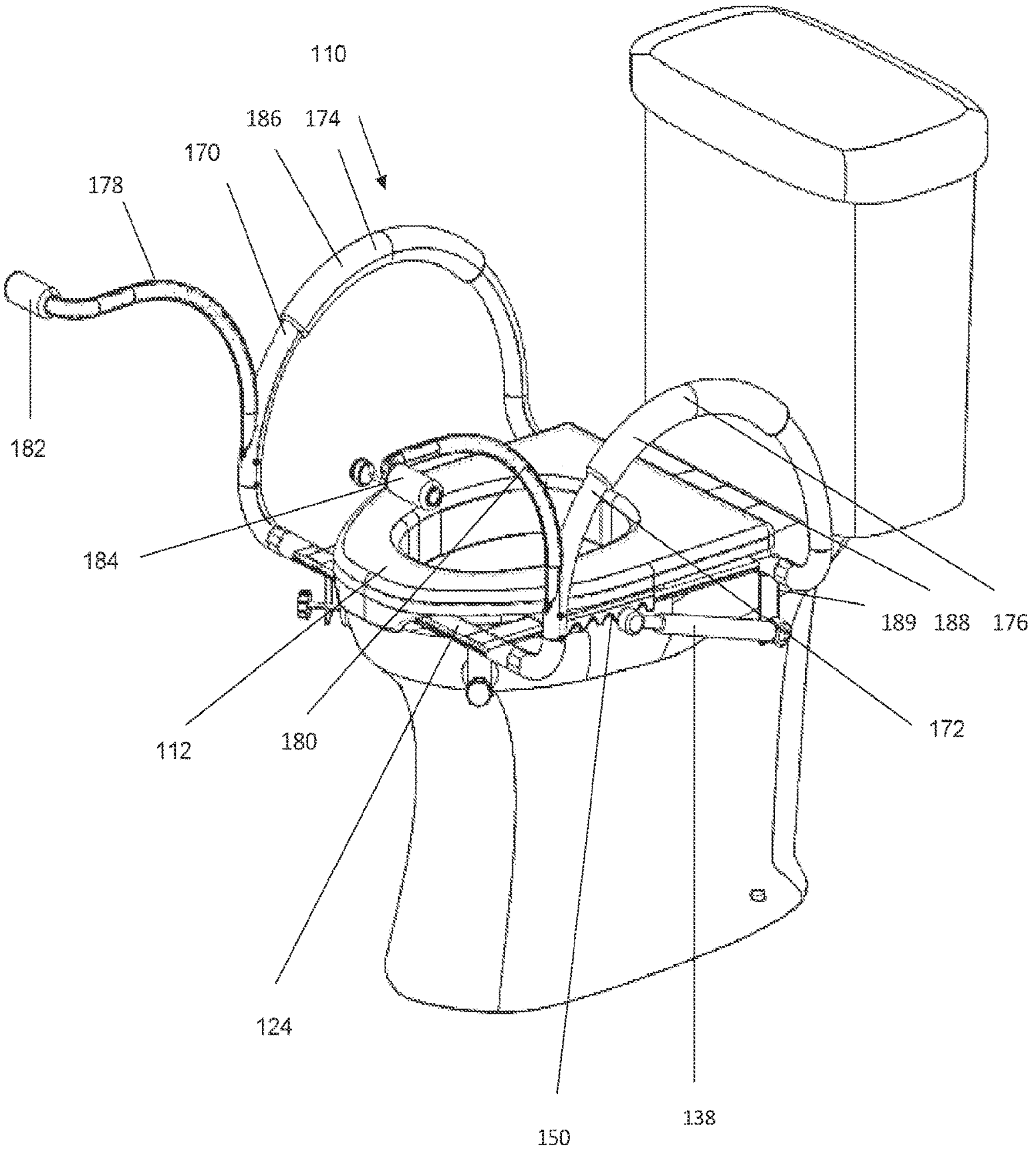
FIG. 1B shows a perspective view of a second embodiment of a toilet seat assist system in accordance with a second embodiment described herein.

Referring to the drawings, FIGS. 1A and 2-12 show the first embodiment of the toilet seat assist assembly 10, and FIG. 1B shows a perspective view of the second embodiment of the toilet seat assist assembly 110. The primary differences between the two embodiments include the shape of the handles and support bars, the shape of the seat, and the attachment of the of the non-electric biasing energy storage mechanism to the base.

Figure 2:
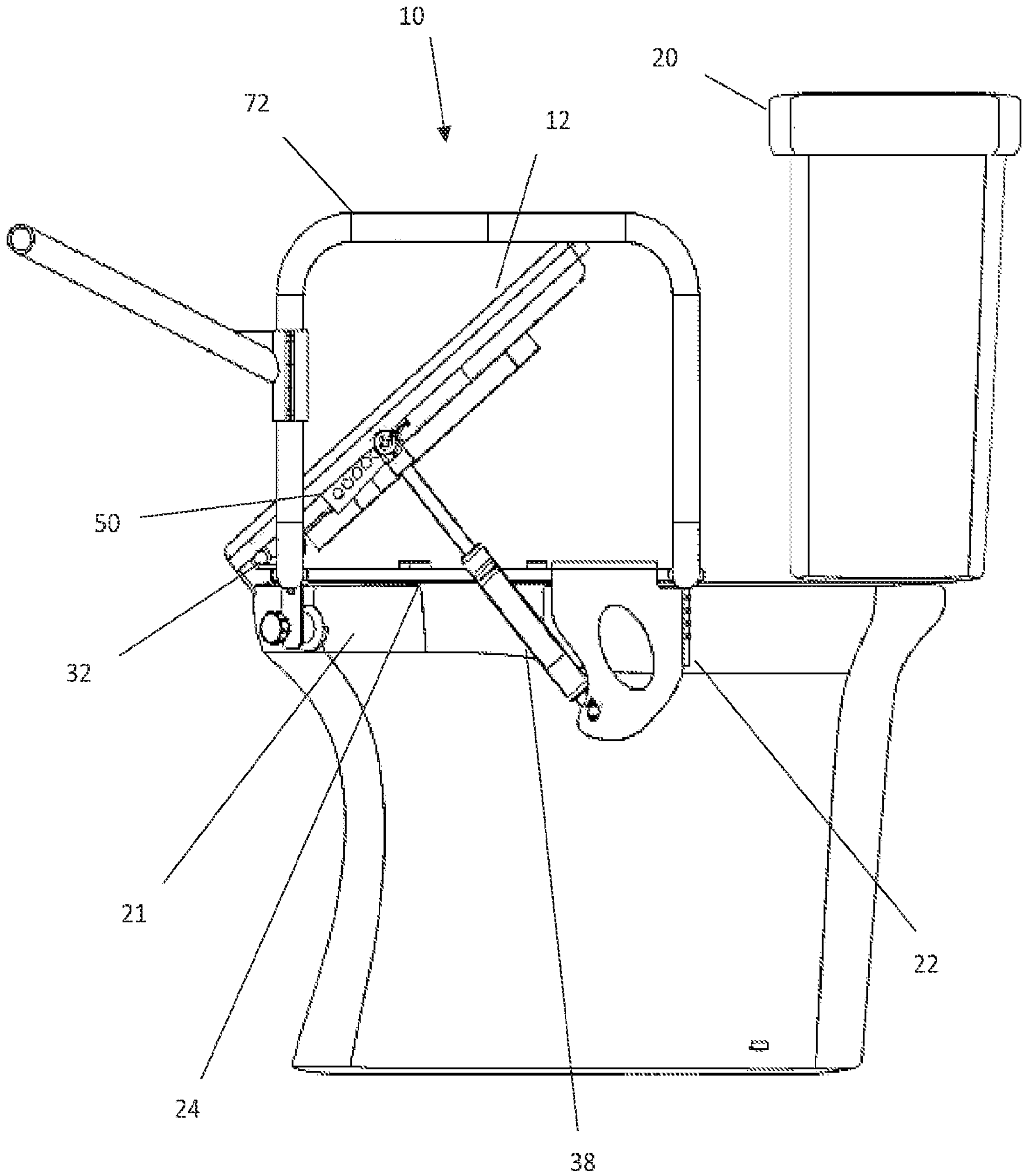
FIG. 2 is a side view embodiment of the toilet seat assist system depicted in the first embodiment.

FIG. 1A shows a perspective view of the first embodiment. FIG. 2 depicts the first embodiment from a side view. The seat assembly 10 comprises a base 24, a seat 12, at least one forward hinge 32, at least one non-electric biasing energy storage mechanism 38, first arm rest 70 and second arm rest 72, and angle selector 50. The angle selector 50 allows a user to change the position of the non-electric biasing energy storage mechanism and therefore changes the resulting stored vertical force from the non-electric biasing energy storage mechanism applied to the seat. This embodiment includes a first support handle 78 with a lifting handle 82 formed at its upper end, and a second support handle 80 with a second lifting handle 84 formed at its upper end. The non-electric energy storage mechanism 38 is connected to the frame feature that maximizes material for strength when loaded by a user sitting.

The embodiment of FIG. 1B is similar in that the toilet seat assist assembly 110 includes a base 124, a seat 112, at least one forward hinge (not visible in the perspective view), at least one non-electric biasing energy storage mechanism 138, and an angle selector 150 which is attached to the base 124. This embodiment includes a curved first arm rest 170 with a first gripping handle 174 that includes a first gripping portion 186, and a curved second arm rest 172 having a second gripping handle 176 that includes a second gripping portion 188. This embodiment also includes a first support handle 178 with a lifting handle 182 formed at its upper end, and a second support handle 180 with a second lifting handle 184 formed at its upper end. The non-electric energy storage mechanism 138 is connected to the frame feature that minimizes material for weight savings.

Referring to FIGS. 1A and 2-12, A standard residential toilet 20 with toilet bowl 21 and toilet bolt holes 22 is also depicted, upon which the toilet seat assist assembly 10 is mounted. In addition to a standard residential toilet 20, in other embodiments, the toilet seat assist assembly can be mounted to elongated, handicap, industrial, and commercial toilets, as well as other suitable toilet variants. The toilet seat assist assembly 10 is not supported on the floor.

Figure 3A:
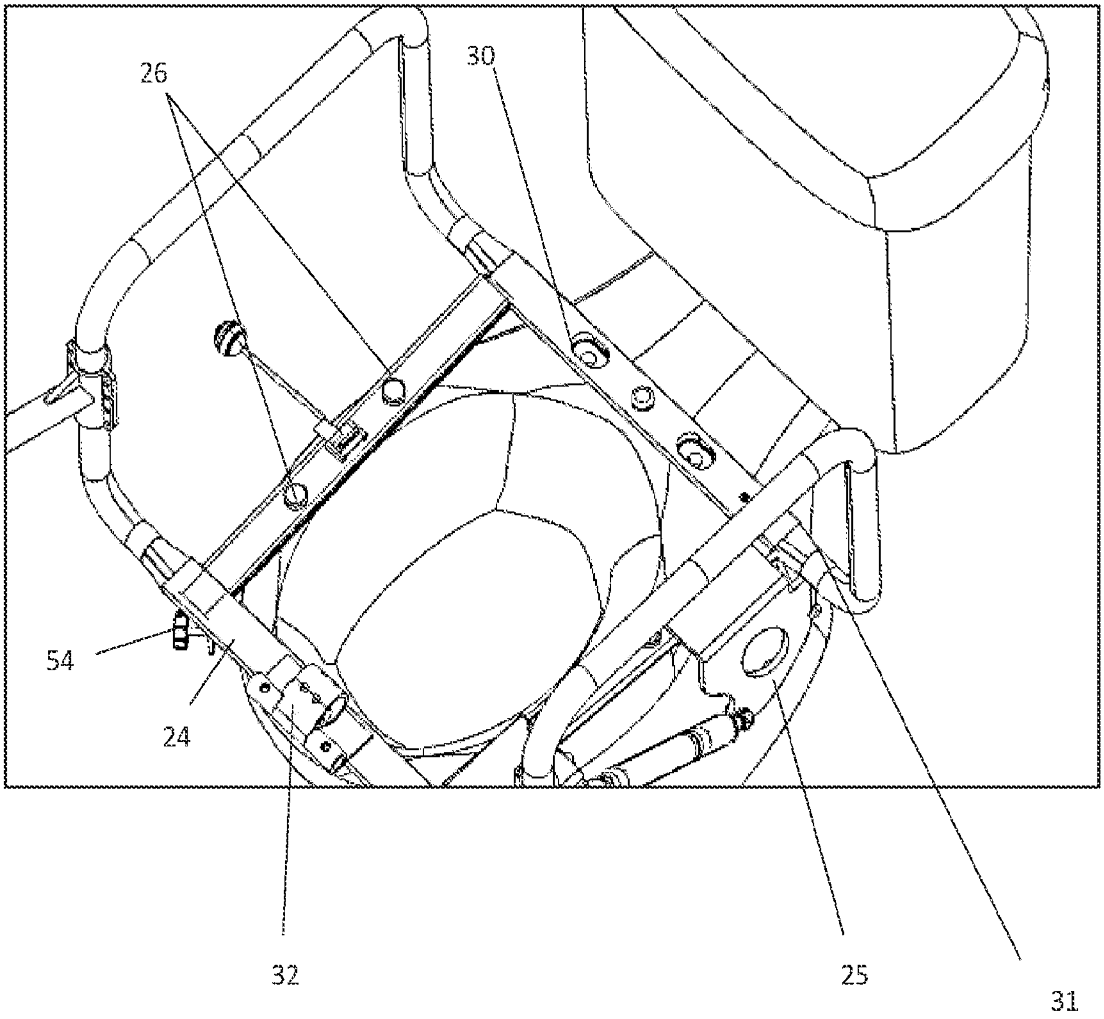
FIG. 3A shows a perspective view of the base of the toilet seat assist system depicted in the first embodiment.

The base 24 illustrated in FIG. 3A comprises a frame that mounts upon the standard toilet bowl 21. In certain embodiments, the frame comprises at least one frame extender 25, to which the aft portion of the non-electric biasing energy storage mechanism 38 attaches to the base 24. Multiple slots 30 for connection to any standard toilet bolt holes 22 are positioned in the aft section of the base. The base 24 is further stabilized to the toilet 20 with a series of clamps, screws, or latches 54 to prevent rocking side to side. The base further comprises connectors 31 to permit the attachment of first arm rest 70 and second arm rest 72 to the base 24. In embodiments, the base 24 comprises at least one member selected from the group consisting of metal, thermoplastic, thermoset, wood, metal and composites.

Figure 3B:
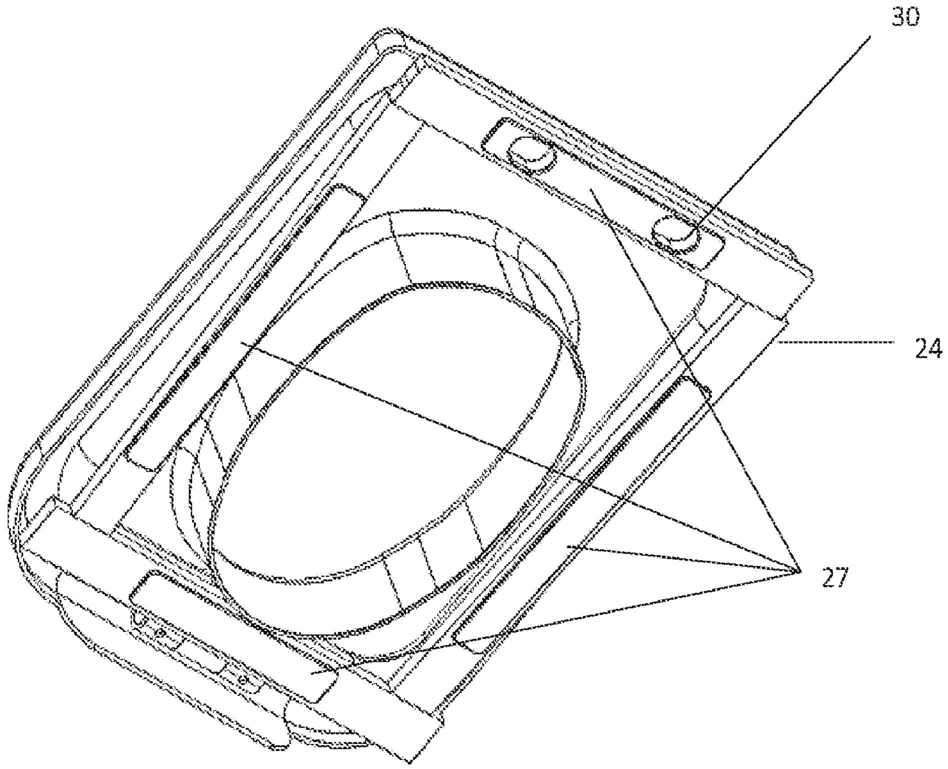
FIG. 3B shows the underside of the base and seat of the toilet seat assist system depicted in the first embodiment.
Figure 3C:
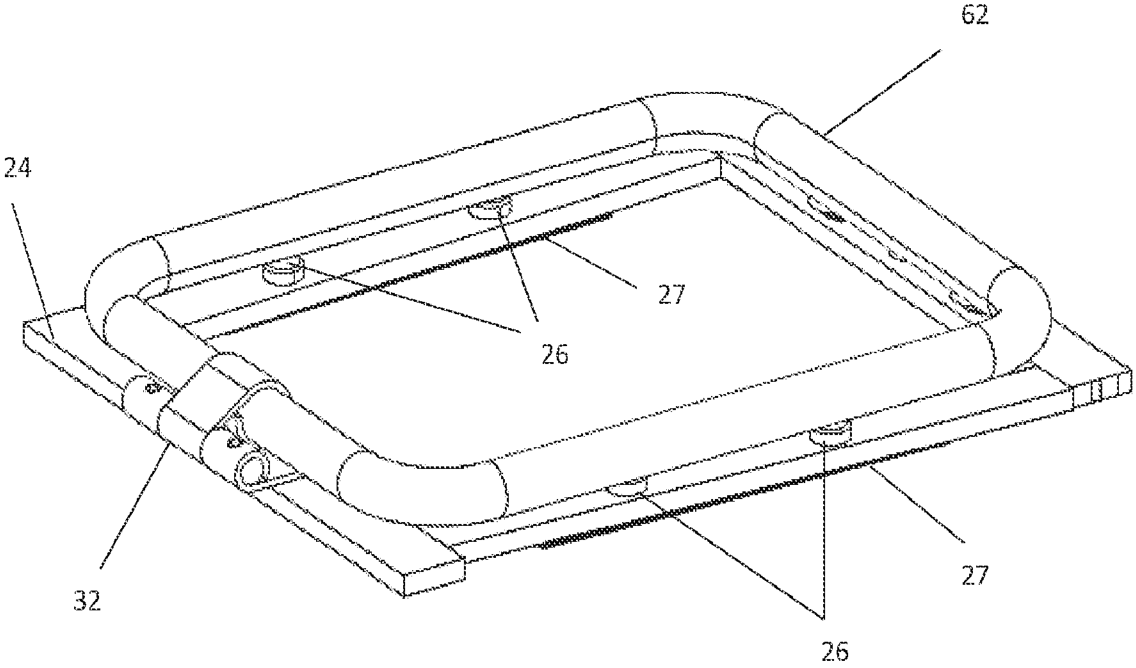
FIG. 3C shows a perspective view of the base and lower portion seat frame of the toilet seat assist system depicted in the first embodiment.

In certain embodiments as show in FIGS. 3A-3C, upper rubber padding 26 and lower rubber padding 27 is used between at least one of metal-ceramic and metal-metal interfaces. As show in both FIG. 3A and FIG. 3C, upper rubber padding 26 can be mounted to the upwards facing portion of the base frame to interface between the base 24 and the seat frame 62. As shown in FIGS. 3B and 3C, in certain embodiments the lower rubber padding 27 is mounted to the downwards facing portion of the base frame to interface between the base 24 and the ceramic toilet bowl 21. It is contemplated that the upper rubber padding 26 and lower rubber padding 27 can also be mounted to other suitable metal-ceramic and metal-metal interfaces.

Figure 4A:
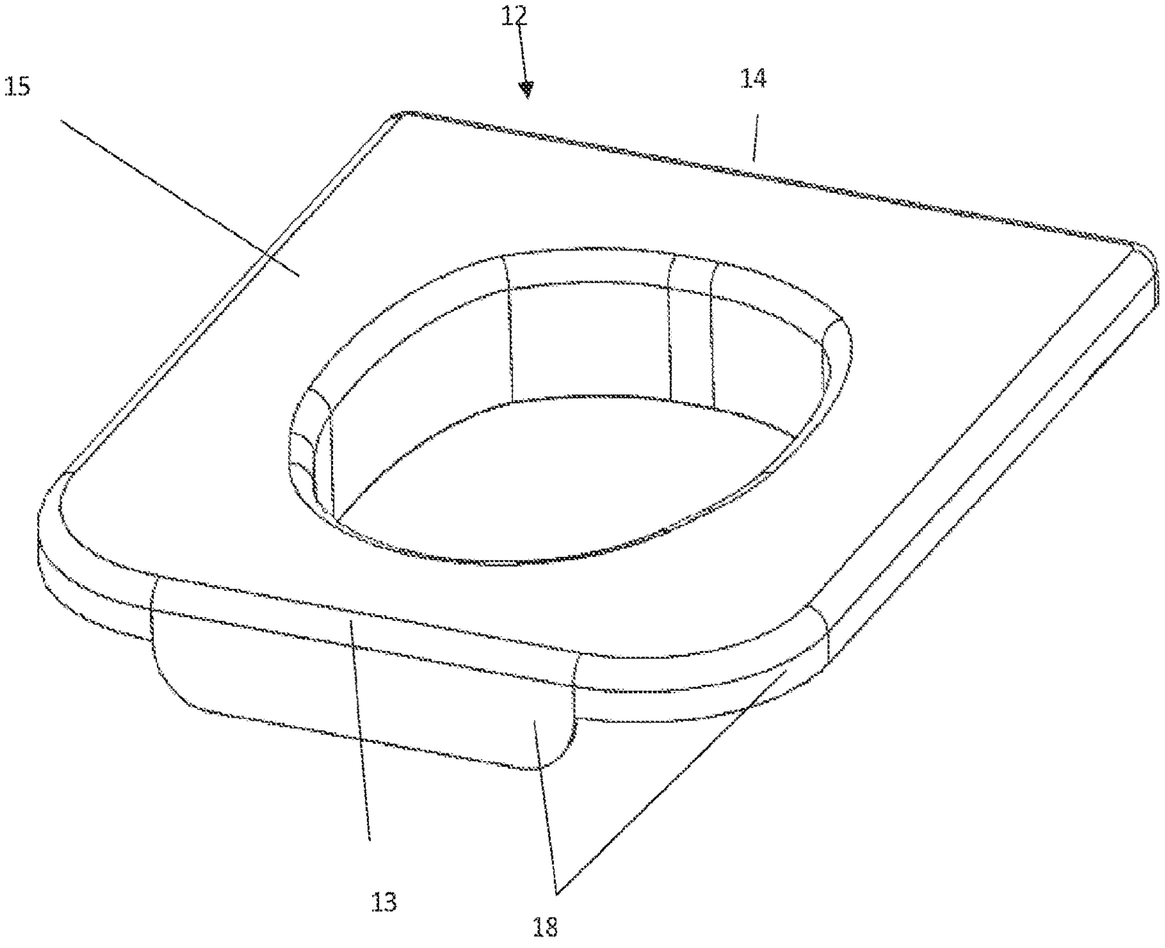
FIG. 4A shows a perspective view of the seat of the toilet seat assist system depicted in the first embodiment.
Figure 4B:
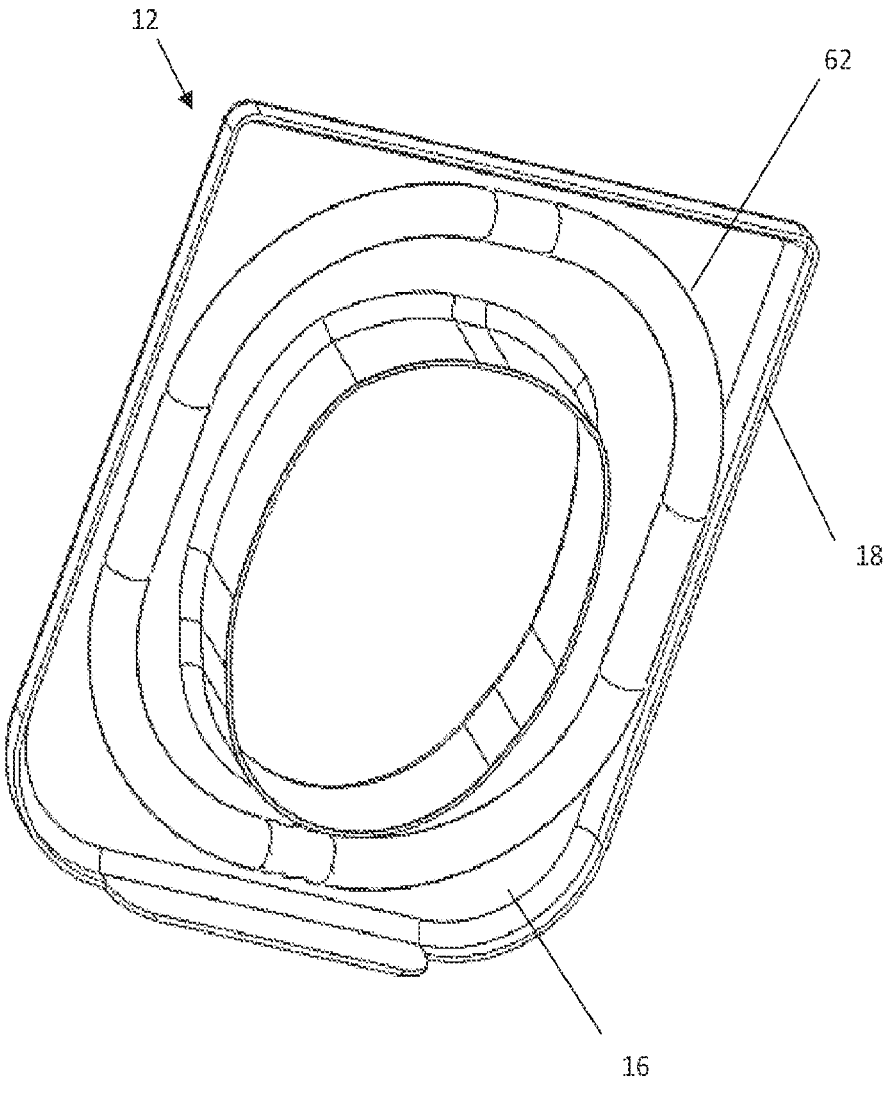
FIG. 4B shows the underside of the seat of the toilet seat assist system depicted in the first embodiment.

The seat 12 depicted in FIGS. 4A and 4B consists of a forward end portion 13, an aft end portion 14, an upper portion 15, a lower portion 16, and a protective skirt 18. The forward end portion 13 is attached to the base 24 by the forward hinge 32 allowing the seat 12 to rotate relative to the base 24. The seat 12 is propelled to a rotated position by at least one non-electric biasing energy storage mechanism 38 positioned at least one of the side and rear of the seat 12. The upper portion 15 comprises a flat oval shaped surface for sitting. A frame 62 can be mounted to the lower portion 16 for additional strength if needed. In many cases, the seat 12 comprises at least one member selected from the group consisting of thermoplastic, thermoset, wood, metal, and composites.

Figure 5A:
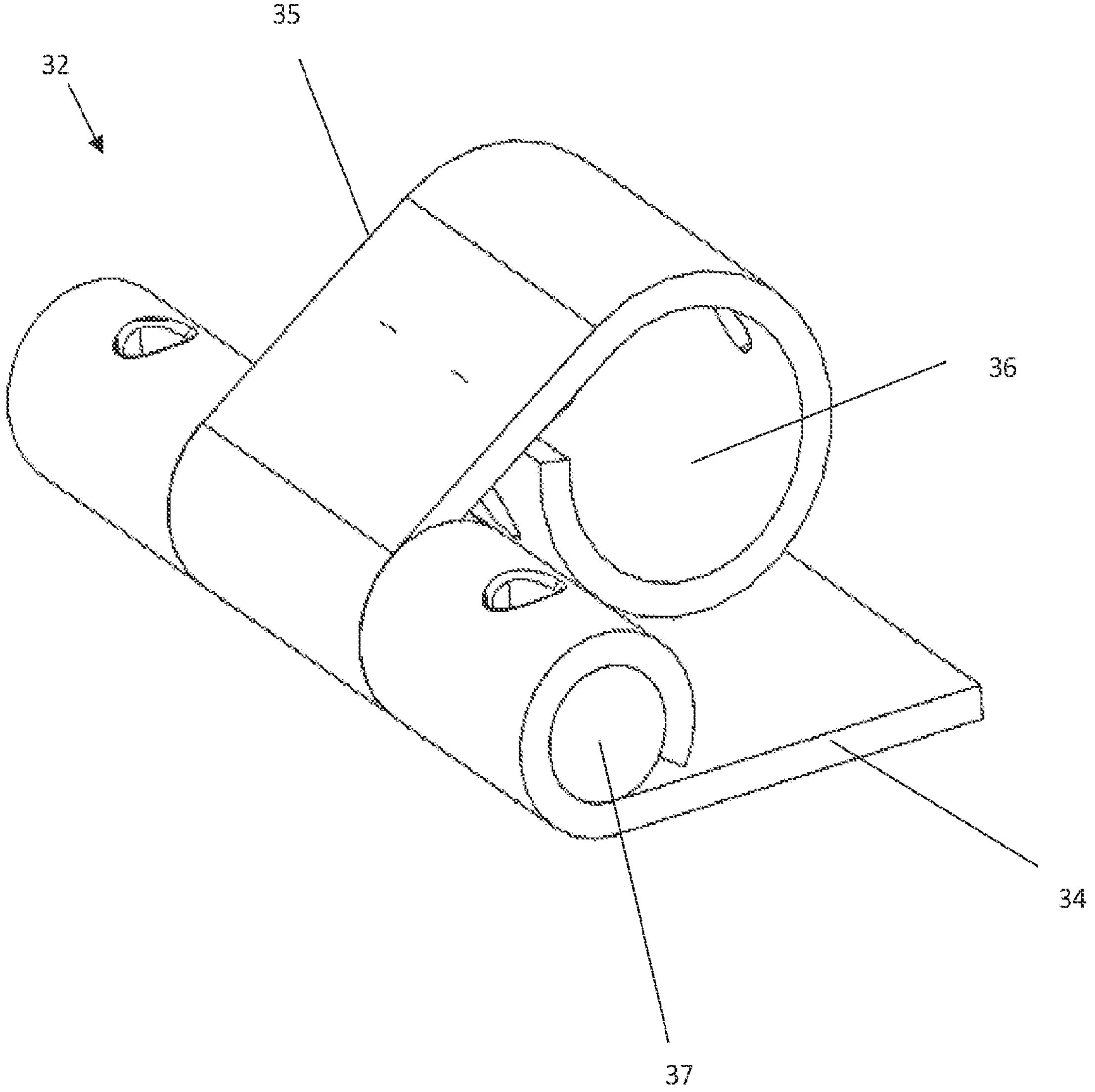
FIG. 5A shows a perspective view of the forward hinge mechanism which connects the base to the seat.
Figure 5B:
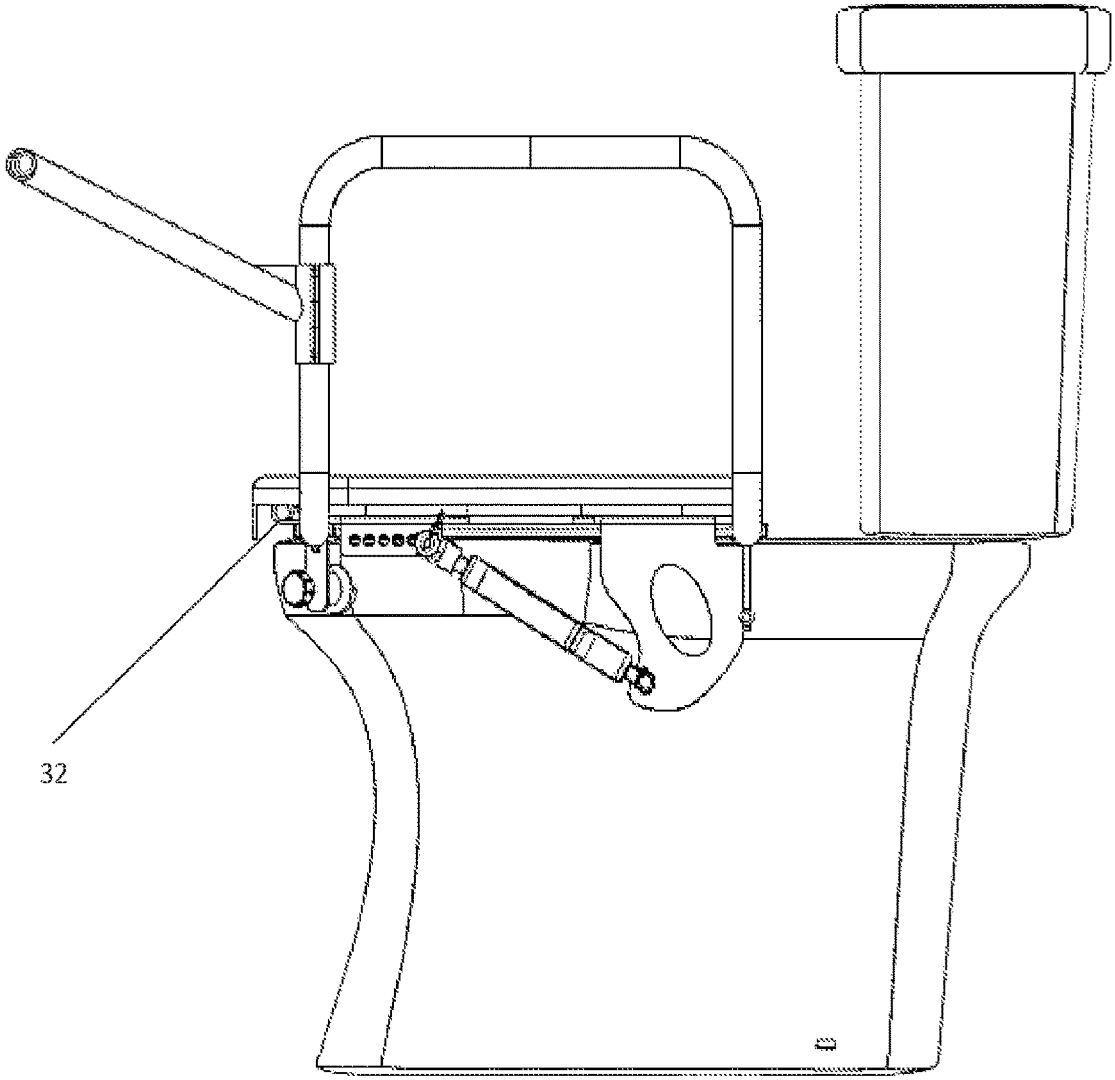
FIG. 5B shows a side view of the forward hinge mechanism in relation to the overall seat assist assembly.

FIG. 5A illustrates the forward hinge 32, which is mounted to the front of both the base 24 and the forward end portion of the seat 13 and allows the seat 12 to rotate relative to the stationary base 24. The forward hinge comprises a lower portion 34 mounted to the base 24 and an upper portion mounted to the forward end portion of the seat 13, wherein the upper portion may further comprise a tubular opening 36 to permit the passage of frame 62. The forward hinge also comprises a pivoting element 37. In embodiments, the forward hinge 32 comprises at least one member selected from the group consisting of thermoplastic, thermoset and metal. FIG. 5B shows a side view of the forward hinge 32 in relation to the overall seat assembly 10. More than one forward hinge 32 may be utilized.

Figure 6:
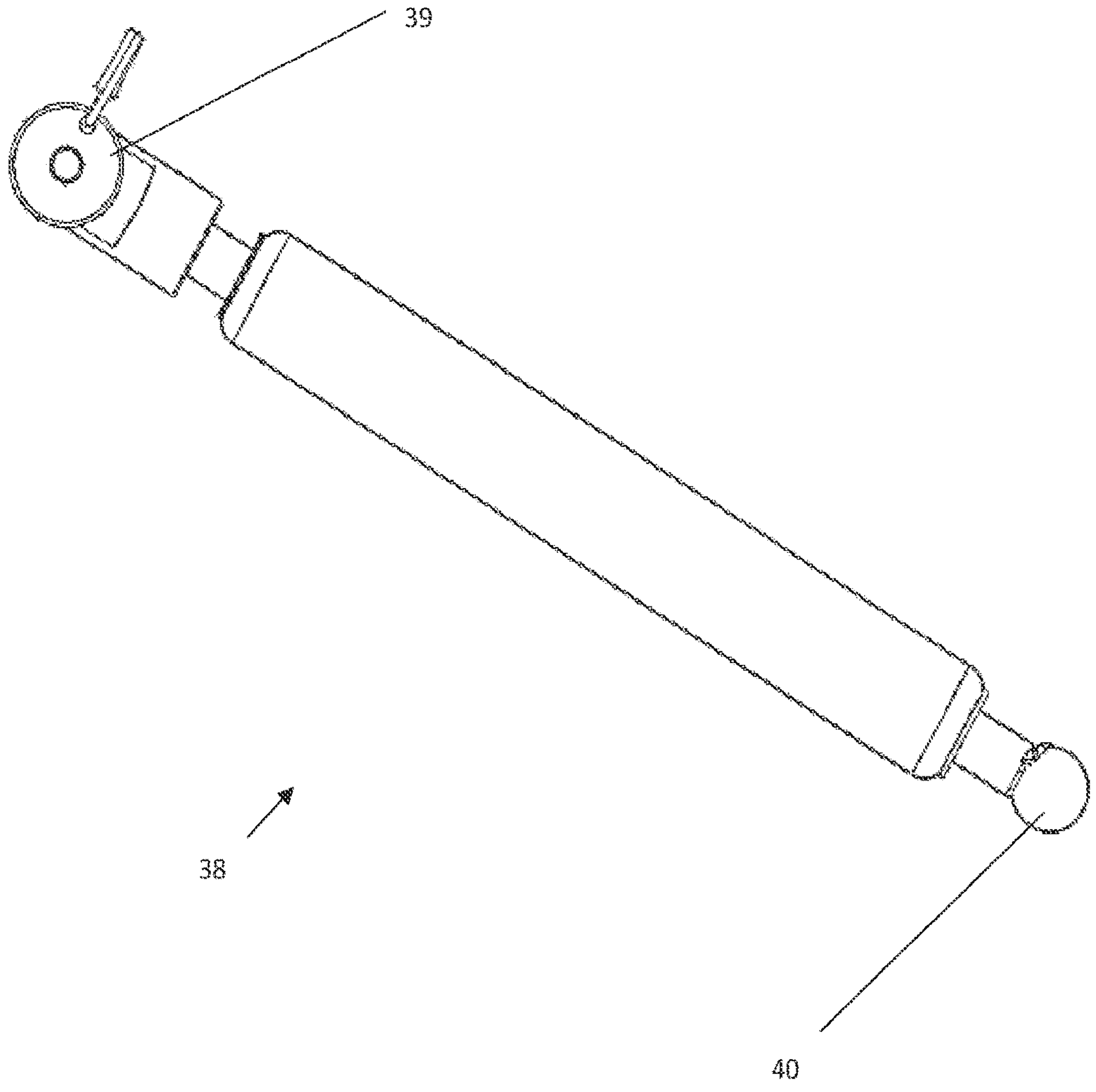
FIG. 6 is an embodiment of a non-electric biasing energy storage mechanism that is connected to the base and the seat.

In embodiments, the non-electric biasing energy storage mechanism 38 illustrated in FIG. 6 comprises a front portion 39 and a rear portion 40. The rear portion 40 is mounted to the base-frame extension 25 and front portion 39 connects to the angle selector 50. It is also contemplated that the rear portion 40 can be attached directly to the aft portion of base 24. In other embodiments, the non-electric biasing energy storage mechanism 38 is housed within the base 24. The non-electric biasing energy storage mechanism 38 is a passive device that supports some amount of predefined load. As the user sits on the seat 12, the non-electric biasing energy storage mechanism 38 will "catch" the user's weight and slowly lower them down. Upon standing, as the user shifts their weight up and forward, the non-electric biasing energy storage mechanism 38 will provide assistance to push the seat 12 and person up. The embodiments disclosed herein comprise a single non-electric biasing energy storage mechanism 38; however, up to two can be used if needed for added assistance. If two non-electric biasing energy storage mechanisms 38 are used, they typically are disposed on opposite sides of the seat assembly 10. In embodiments, the non-electric biasing energy storage mechanism 38 can be a gas spring, an open-coil compression spring, or another suitable alterative. The non-electric biasing energy storage mechanism 38 often comprises at least one member selected from the group consisting of a metal, thermoplastic or thermoset spring surrounded by a metal, thermoplastic or thermoset casing. In embodiments, the non-electric biasing energy storage mechanism 38 can support up to 80% of a user's weight, or up to 70% of a user's weight. In embodiments, the non-electric biasing energy storage mechanism 38 can support about 50%-90%, 60%-80%, or about 65%-75% of a user's weight.

Figure 7A:
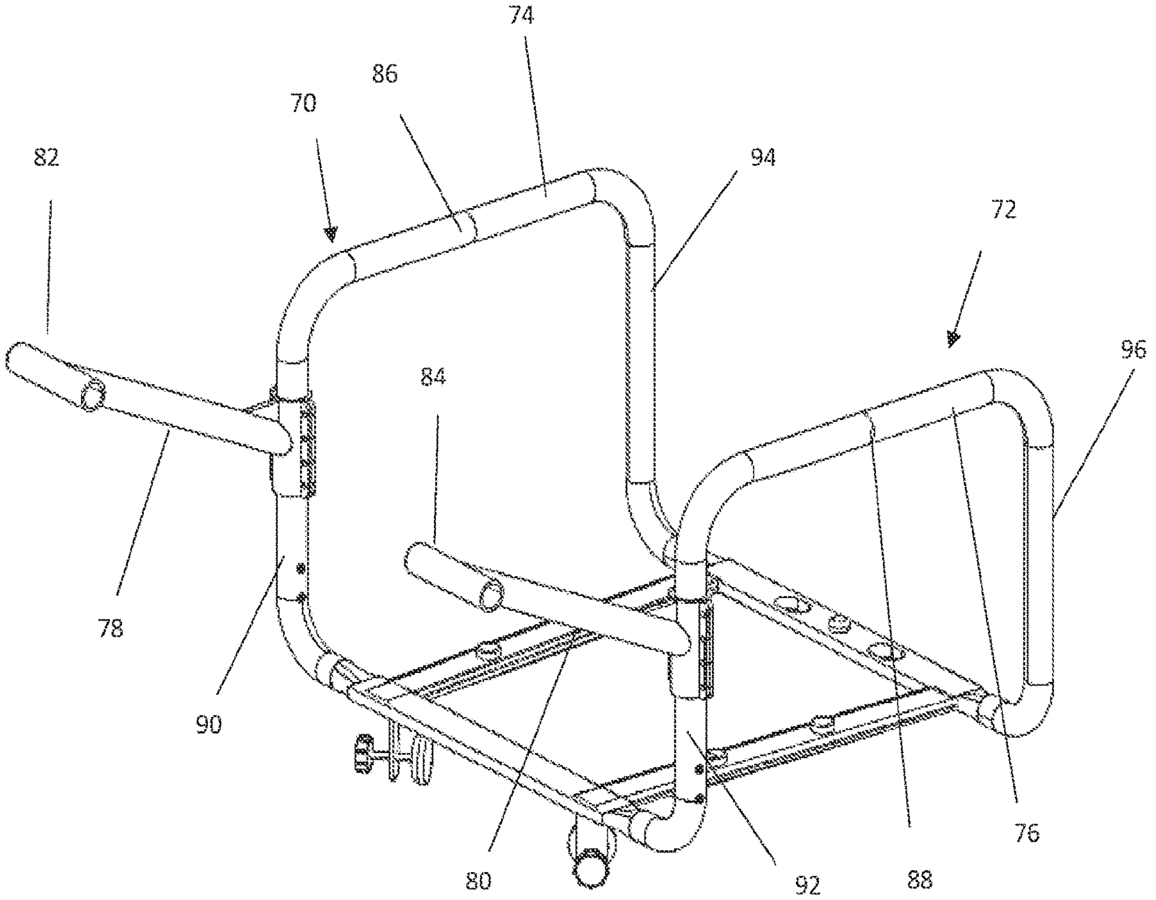
FIG. 7A depicts one example of first and second arm rest supports depicted in the first embodiment.

In embodiments, the first arm rest 70 and the second arm rest 72 shown in FIG. 7A are comprised of first gripping handle 74 and second gripping handle 76, respectively, which respectively are each further comprised of a first and second central gripping portion 86 and 88, and at least one of a first and second front extension 90 and 92, and a first and second rear extension 94 and 96. In further embodiments, first support handle 78 and second support handle 80, respectively mounted to the front extensions 90 and 92, are upwardly and outwardly extending and can function as support bars to connect first and second lifting handles 82 and 84 to the remainder of the arm rests.

Figure 7B:
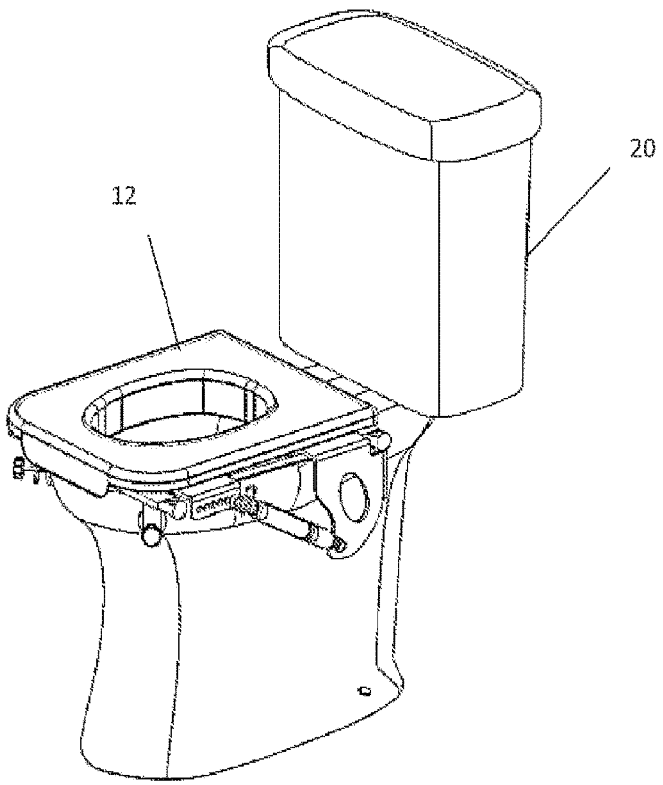
FIG. 7B depicts the toilet seat assist system depicted in the first embodiment with the first and second arm rest supports removed.
Figure 7C:
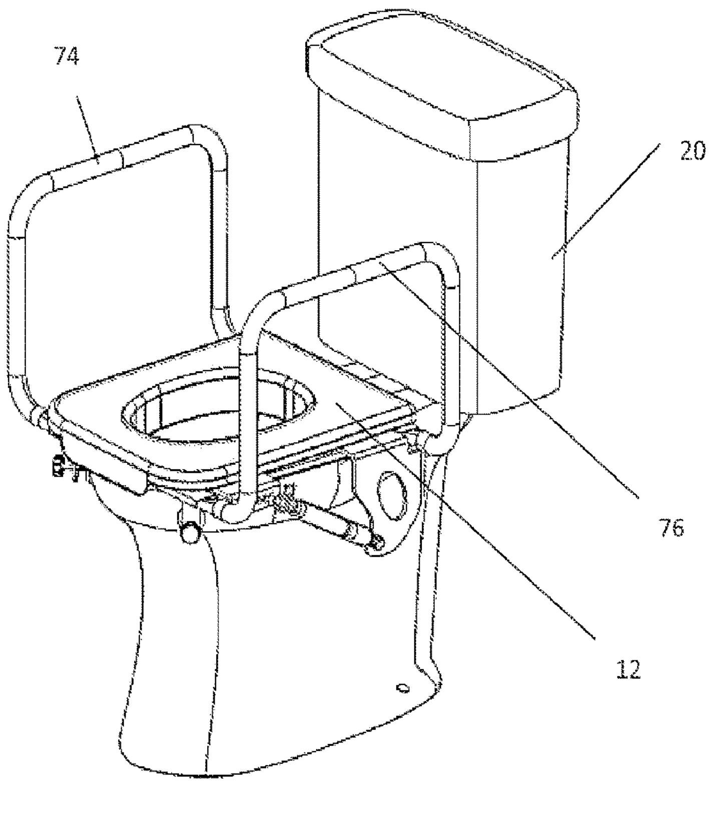
FIG. 7C depicts the toilet seat assist system depicted in the first embodiment with the first and second arm support handles, but with the first and second lifting handles removed.
Figure 7D:
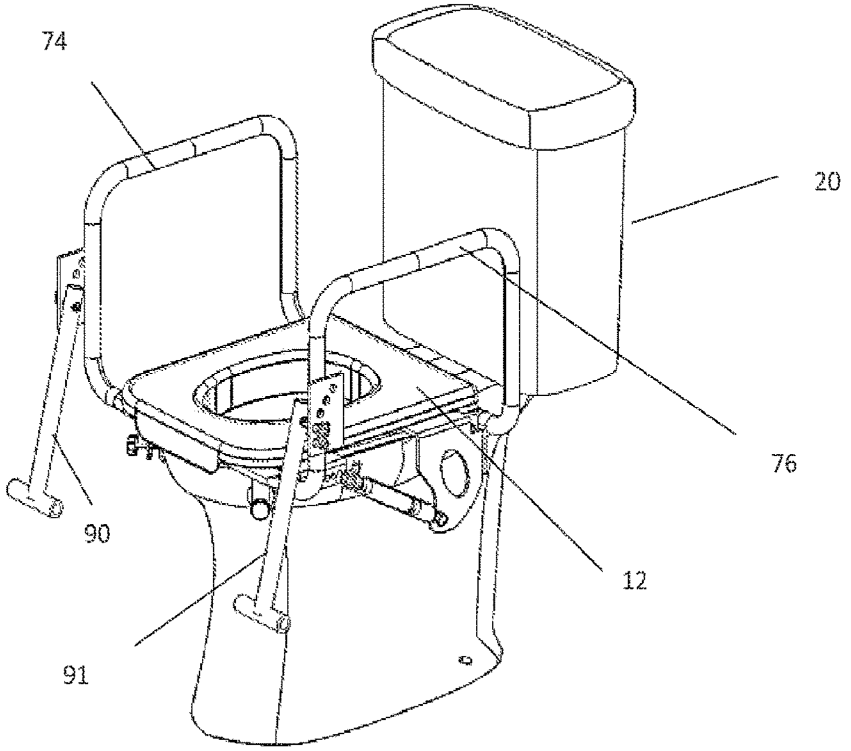
FIG. 7D depicts the toilet seat assist system depicted in the first embodiment with the first and second lifting handles adjusted in a downward storage orientation.
Figure 7E:
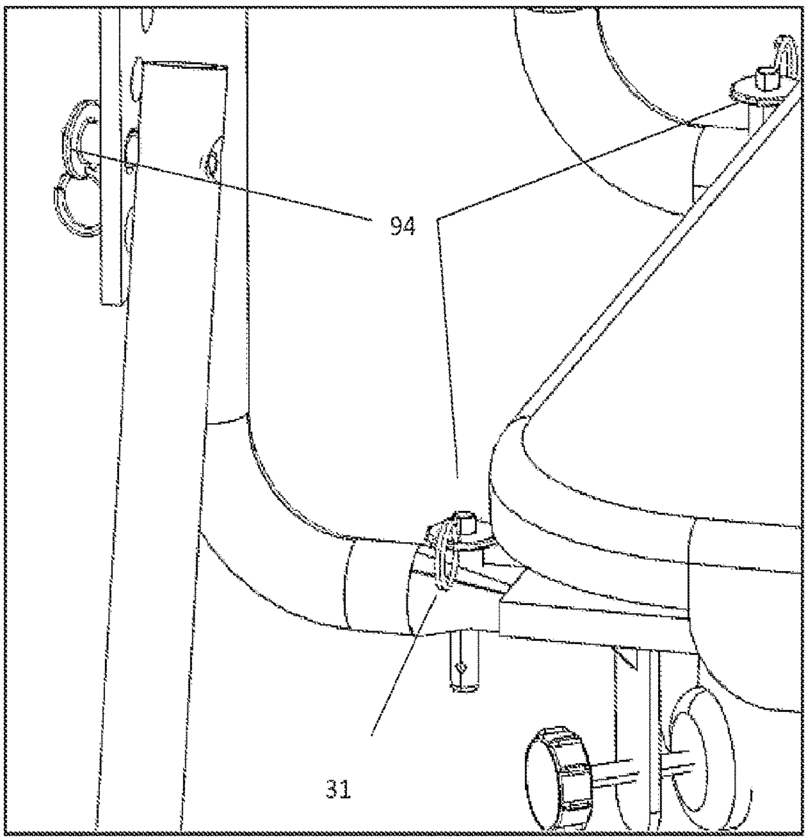
FIG. 7E depicts one possible embodiment of spring-loaded pins used to assist in removal and adjustment of the first and second arm rests supports and the first and second arm rest support handles.

In embodiments, the first arm rest 70 and the second arm rest 72 are formed from tube-type material, although a solid material also can be used. In embodiments, the arm rest tubing is mounted to at least one of the base 24 and the seat 12 and remains stationary throughout the process to allow the user to grasp for support when sitting and standing. In another embodiment, the first arm rest 70 and the second arm rest 72 can be configured to rotate with the seat 12. The first gripping handle 74 and second gripping handle 76, the first support handle 78 and second support handle 80, and the first lifting handle 82 and second lifting 84 are all options for the user to utilize in the sit/stand process depending upon their preferences. As shown in FIGS. 7B-7D, the first arm rest 70 and the second arm rest 72 are removable if not desired for use and also adjustable to serve different heights and arm lengths. In embodiments, the first arm rest 70 and the second arm rest 72 can be removed or adjusted in their entirety, or alternatively, at least one of the first gripping handle 74 and second gripping handle 76, the first support handle 78 and second support handle 80, and the first lifting handle 82 and second lifting handles 84 can be removed independently. As show in FIG. 7E, in embodiments removability and adjustability is enabled with using spring-loaded pins 94 to remove and adjust arm rests. In embodiments, the arm rest tubing comprises at least one member selected from the group consisting of metal, thermoplastic, thermoset and composites. In embodiments, the arm rests are made from a solid material having a circular or rectangular cross section. The curved first arm rest 170, curved second arm rest 172, first lifting handle 182 and the second lifting handle 184 of the embodiment shown in the embodiment of FIG. 1B also can be constructed to be removable, and the first lifting handle 182 and the second lifting handle 184 can be constructed to pivot into a storage position.

Figure 8:
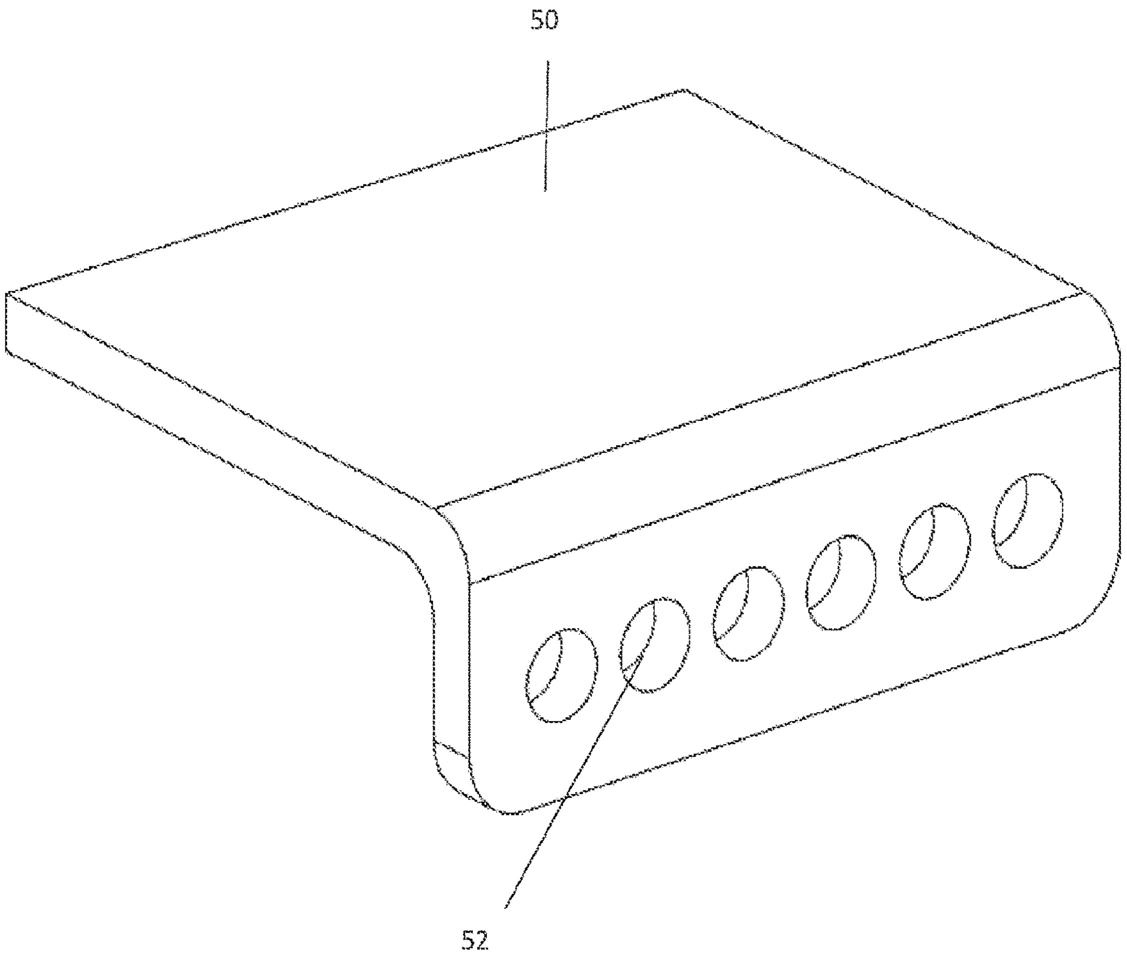
FIG. 8 depicts the angle selector mechanism that allows the user to adjust the non-electric biasing energy storage mechanism relative to the seat.

The angle adjuster 50 in FIG. 8 comprises a plurality of holes 52 used for connection with a nut, bolt, or pin which may or may not be spring loaded to adjust the angle of the seat 12 relative to the base 24 and is used to adjust for different user weights. The angle adjuster 50 connects to at least one of the side and rear of the seat 12. In embodiments, the number of holes 52 can vary from one to eight, or two to seven, or three to six. In embodiments, the angle adjuster 50 comprises at least one member selected from the group consisting of metal, thermoset material and thermoplastic material, and combinations thereof.

Figure 9C:
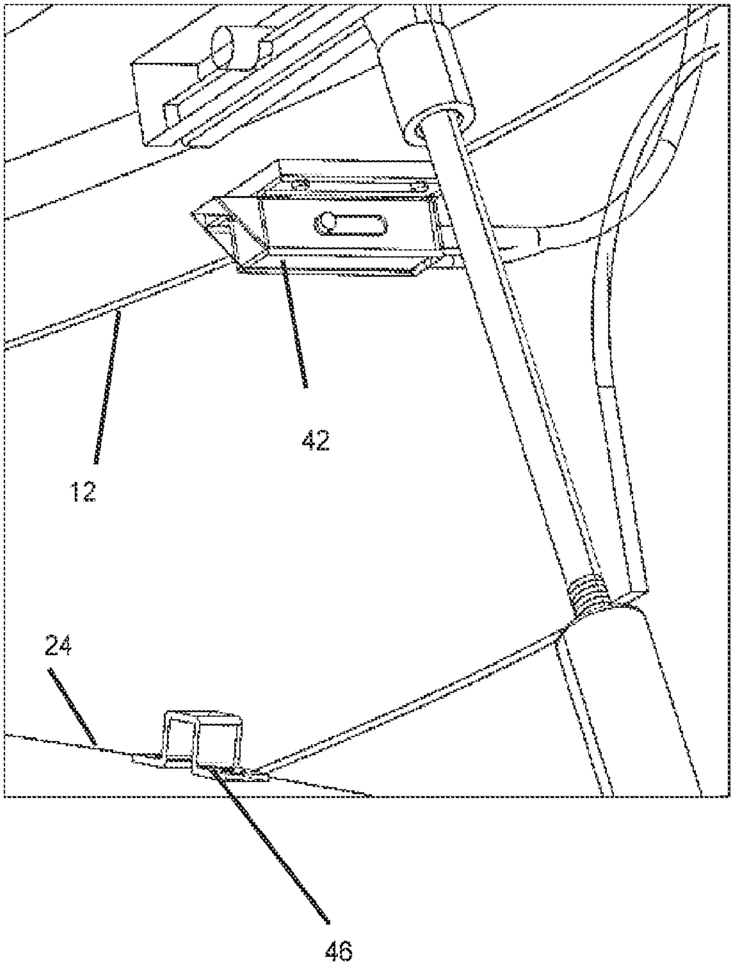
FIG. 9C shows the locking mechanism depicted in FIG. 9A mounted to the seat.

FIGS. 9A-9B illustrate one potential embodiment for a locking mechanism 41 that secures the seat 12 in the lowered position upon sitting. This embodiment is a latch type lock in which a bolt 42 is engaged and disengaged via a lever 44. The bolt 42 is mounted to at least of the side and rear of the seat 12 and the receiver 46 is mounted to the base 24. The locking mechanism 41 often comprises at least one member selected from the group consisting of metal, thermoset material and thermoplastic material. Other embodiments not depicted can include but are not limited to spring plungers or pin features.

Figure 10A:
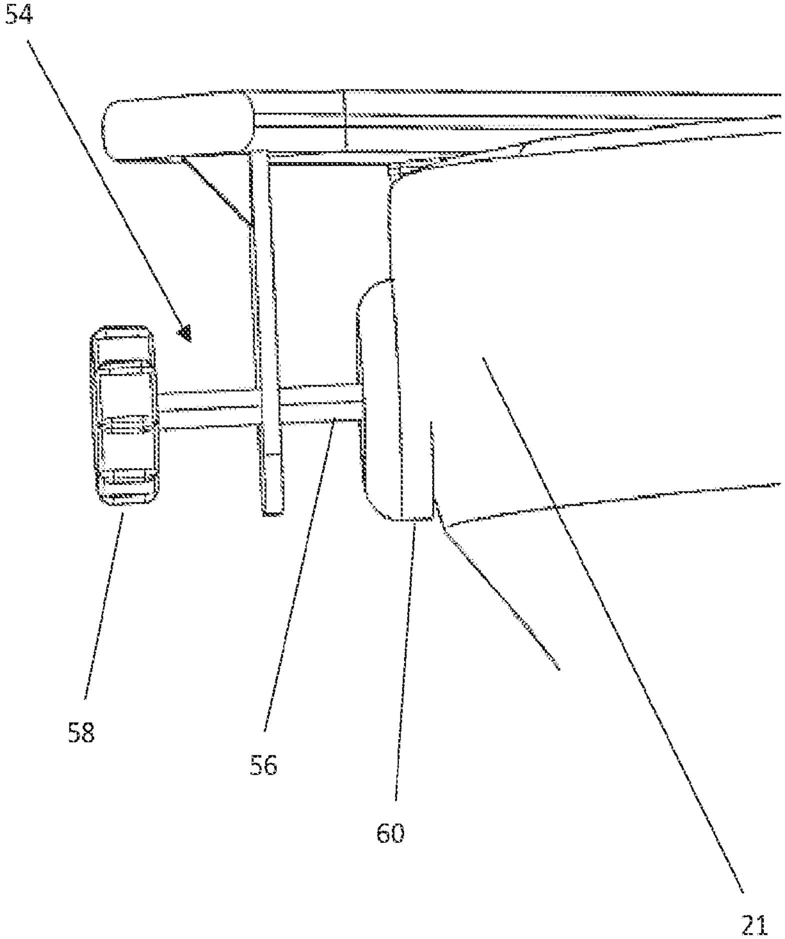
FIG. 10A shows clamp mounted within the base in accordance with the first embodiment.
Figure 10B:
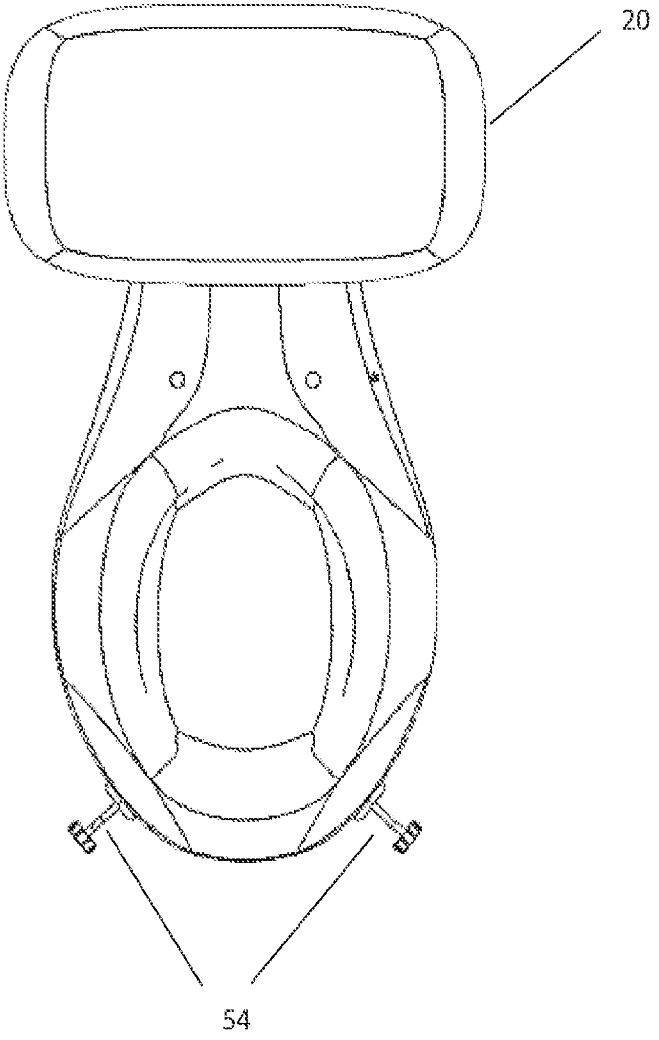
FIG. 10B shows a top view depicting clamps in accordance with the first embodiment.
Figure 10C:
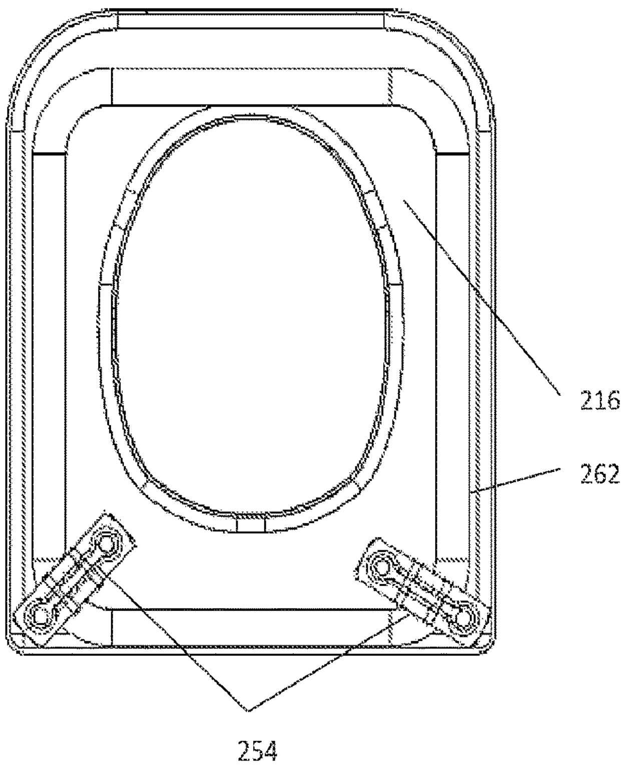
FIG. 10C shows an underside view of the seat in a third embodiment, wherein the clamps are used to secure the seat frame to the lower portion of the seat.
Figure 10D:
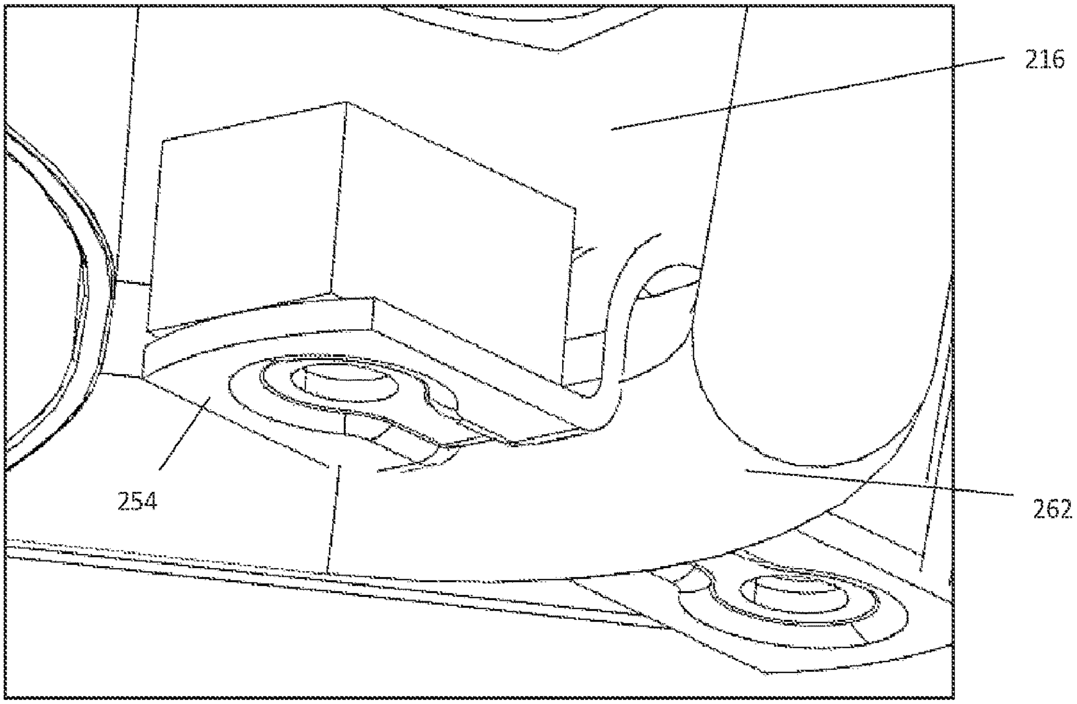
FIG. 10D shows a perspective underside view of the seat in a third embodiment, wherein the clamps are used to secure the seat frame to the lower portion of the seat.

FIGS. 10A-10B show the clamps 54 that can secure the base 24 to a standard toilet bowl 21. In embodiments, the clamps 54 consist of a threaded rod 56, with a turn handle on the exterior end 58 and a rubber or other thermoset material, silicone, thermoplastic, or similar connection to the toilet on the interior end 60. The clamps 54 typically comprise at least one member selected from the group consisting of metal, thermoplastic, and thermoset (rubber). Other embodiments not depicted can include but are not limited to screws or latches. As show in FIGS. 10C-10D, in a third embodiment, clamps 254 may also be used to secure the frame 262 to the lower portion 216 of the seat.

Figure 11A:
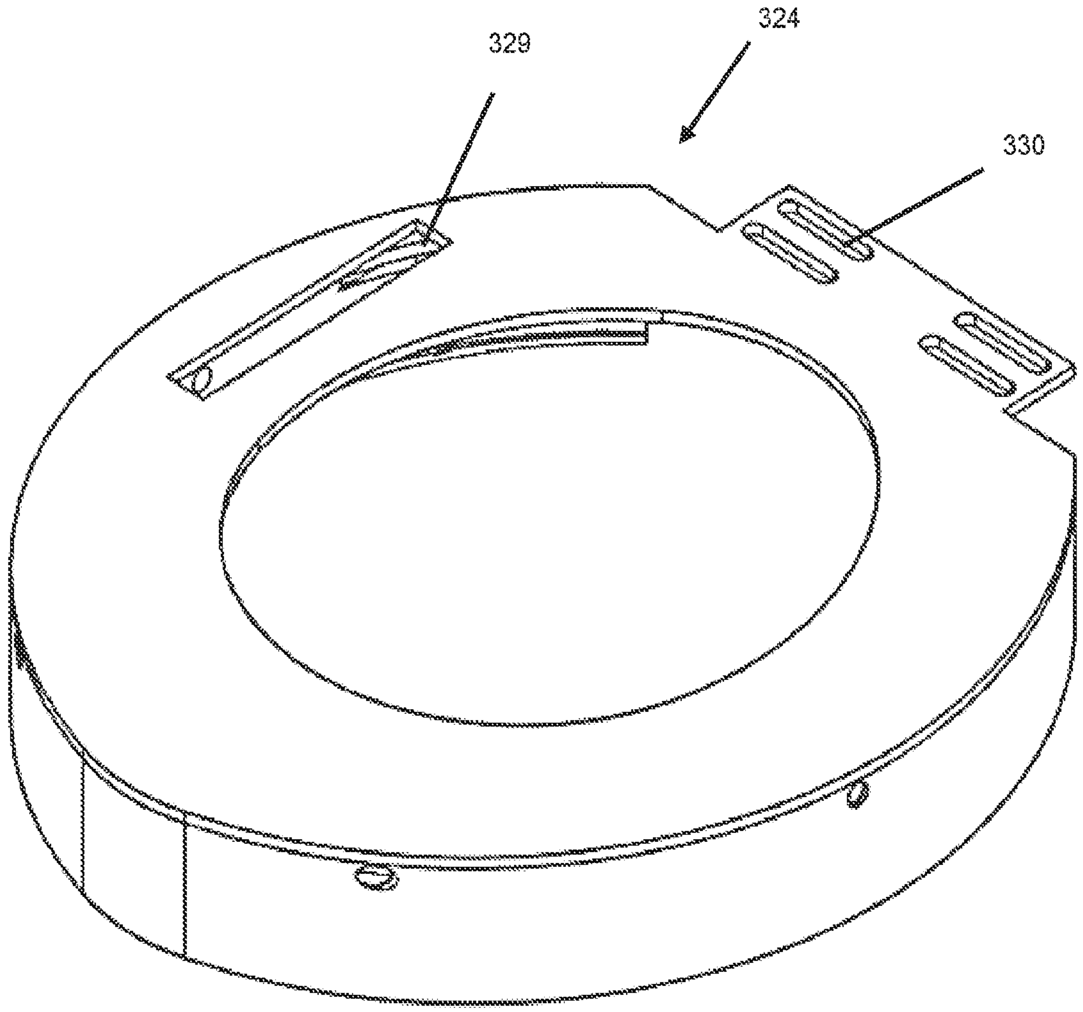
FIG. 11A shows a perspective view of a third embodiment of the base.
Figure 11B:
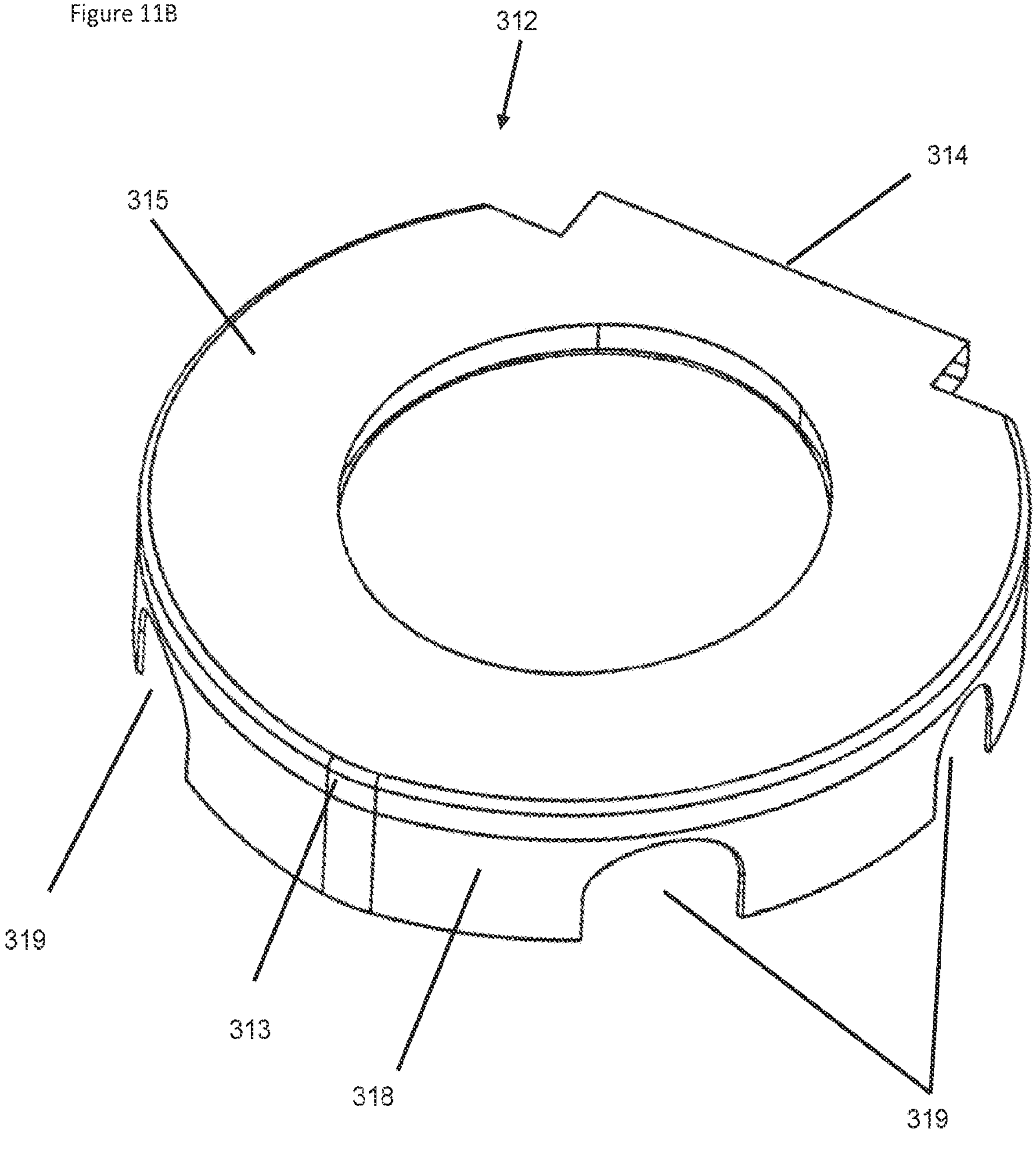
FIG. 11B shows a perspective view of a third embodiment of the seat.

FIG. 11A shows a fourth embodiment of the base 324 comprising a frame that mounts upon the standard toilet bowl. Multiple slots 330 for connection to any standard toilet bolt holes are positioned in the aft section of the base. In embodiments, the base 324 can have at least one cutout 329 to permit the housing of the non-electric biasing energy storage mechanism 338. FIG. 11B shows the seat 312 in this same fourth embodiment, comprising a forward end portion 313, an aft end portion 314, an upper portion 315, a lower portion 316, and a protective skirt 318. In embodiments, cutouts 319 permit the passage of the arm rests.

Figure 12:
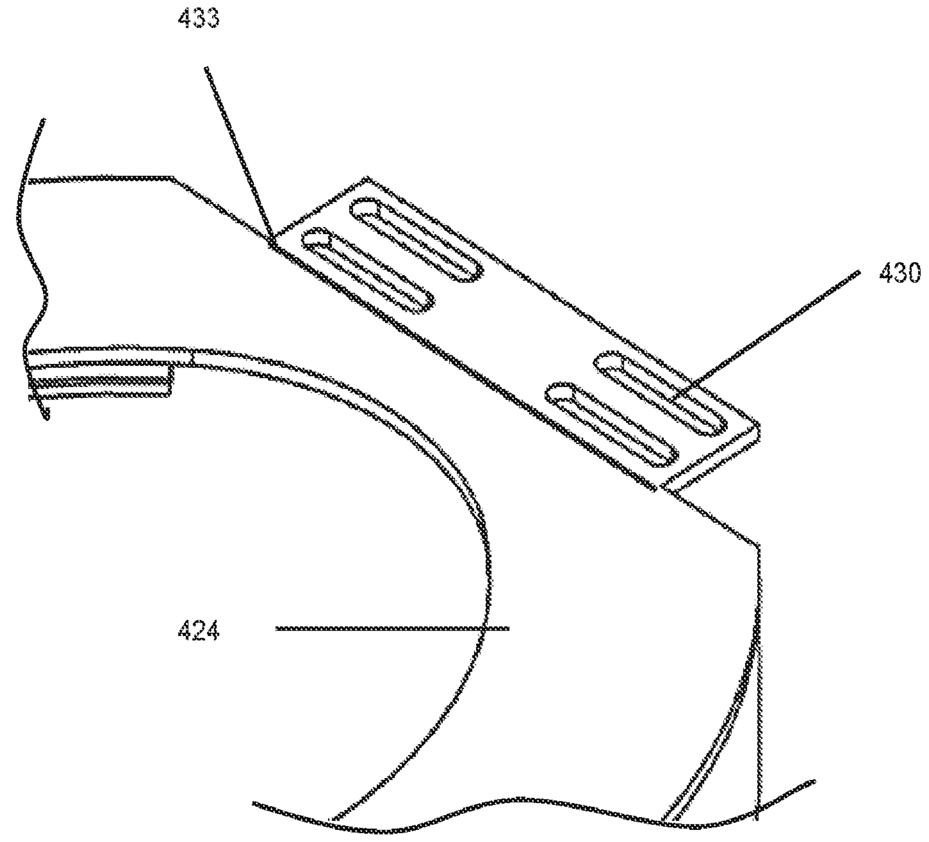
FIG. 12 shows a fourth embodiment in which an aft hinge mechanism allows the base to fold upward in a vertical orientation.

FIG. 12 is a fifth embodiment in which at least one aft hinge 433 is mounted on the base 424 forward of the toilet seat bolt hole slots 430 in which the base 424 can hinge upward to fold up to a vertical position. The intent of this is for men who do not want to sit to use the toilet and therefore they can easily fold the seat 412 upward and out of the way. In embodiments, the aft hinge 433 is formed from at least one member selected from the group consisting of thermoplastic material, thermoset material, metal and composites.

In embodiments, when the seat is in a horizontal position and the support handles are in an operating position, the first and second support handles 78, 80 extend forwardly and upwardly at an angle of about 20 degrees to about 80 degrees relative to a horizontal direction. In some cases, when the seat is in a horizontal position and the support handles are in an operating position, the first and second support handles 78, 80 extend forwardly and upwardly at an angle of about 30 to about 65 degrees relative to a horizontal direction.

In regard to the time frame involved in operation, 3-5 seconds is the ideal duration to go from standing to seated, but in some cases can involve 2-12 seconds depending upon user's weight and ability. Alternatively, 6-12 seconds is the ideal duration to go from seated to standing, but can involve 6-20 seconds depending upon user's weight and ability.

It is contemplated that the system may incorporate modular features including different seat types (padded, raised, etc.), a lid, and adjustable features for space limitation, and a bidet attachment. Additionally, it is contemplated that the system may incorporate modular seat attachments such as luxury soft seat covers, protective coverings for pinch points such as a skirt around the base and seat, wider and more strengthened models for heavy set users, and pressure or load sensors to predict instances of falls.

A number of alternatives, modifications, variations, or improvements therein may be subsequently made by those skilled in the art, which are also intended to be encompassed by the following claims.

What is claimed is:

1. A method to assist a user in lowering themselves onto, and raising themselves off of, a toilet, the method comprising:

providing an apparatus including a seat having a forward end portion, an aft end portion, a base mounted to the toilet, at least one forward pivot mechanism connecting the seat to the base and enabling the seat to rotate relative to the base, at least one non-electric biasing energy storage mechanism configured to move the aft end portion of the seat between a lowered position and a raised position, first and second arm rests mounted to the base, first and second support handles that are upwardly and outwardly extending from the first and second arm rests relative to the seat, and first and second lifting handles formed on upper ends of the first and second support handles and extending orthogonally outwardly therefrom, wherein the user operates the apparatus through:

upwardly rotating the aft end portion of the seat through operation of the at least one non-electric biasing energy storage mechanism such that the seat is in an angled position relative to a horizontal plane, assisting the user in sitting down on the seat, the weight of the user causing the seat to rotate from the angled position to a horizontal position in a controlled manner, locking the seat into the horizontal position using a lock coupled to the seat, the lock including a lever coupled to a latch by way of an elongated member, the lever being positioned above the latch, actuating the latch using the lever and elongated member, assisting the user in raising themselves off of the seat with a portion of their weight supported by the first and second support handles and the first and second lifting handles, the aft end portion of the seat rotating upwardly through operation of the at least one non-electric biasing energy storage mechanism as the user moves from a seated position to a standing position, and wherein the apparatus includes first and second gripping handles on the first and second arm rests respectively, and the user holds the first and second gripping handles while sitting down on the seat as the seat moves between the angled position and the horizontal position.

2. The method of claim 1, wherein the at least one of non-electric biasing energy storage mechanism includes a gas spring.

3. The method of claim 1, wherein the at least one of the first and second gripping handles, the first and second support handles, and the first and second lifting handles are adjustable.

4. The method of claim 3, wherein the first and second support handles are configured to rotate downwardly towards a floor and be secured in a space saving position.

5. The method of claim 1, wherein at least one of the first and second gripping handles, the first and second support handles, and the first and second lifting handles are removable.

6. The method of claim 1, wherein the apparatus includes clamps configured to support the apparatus on the toilet.

7. The method of claim 1, wherein wherein the frame of the apparatus comprises one or more tubular members for reinforcing the frame.

8. The method of claim 7, wherein the one or more tubular members include at least one first tubular member positioned under a first side portion of the seat and at least one second tubular member positioned under a second side portion of the seat and transverse to the at least one first tubular member.

9. The method of claim 1, wherein the apparatus includes at least one aft hinge configured to connect the base to the toilet to support the apparatus on the toilet, and to allow the base and the seat to temporarily rotate upwardly to a vertical orientation.

10. The method of claim 1, wherein the apparatus includes at least one of a splash guard and protective skirt that is mounted to the seat.

11. The method of claim 1, wherein the first and second support handles are rotatable from a first conformation being upwardly and outwardly extending and a second conformation being downwardly and outwardly extending.

12. The method of claim 1, wherein the non-electric biasing energy storage mechanism can support up to 80% of a user's weight.

13. The method of claim 1, comprising adjusting a maximum extended position of the at least one non-electric biasing energy storage mechanism using an angle selector connected to a frame of the apparatus, the frame being connected to the seat.

* * * * *